Figure 1:
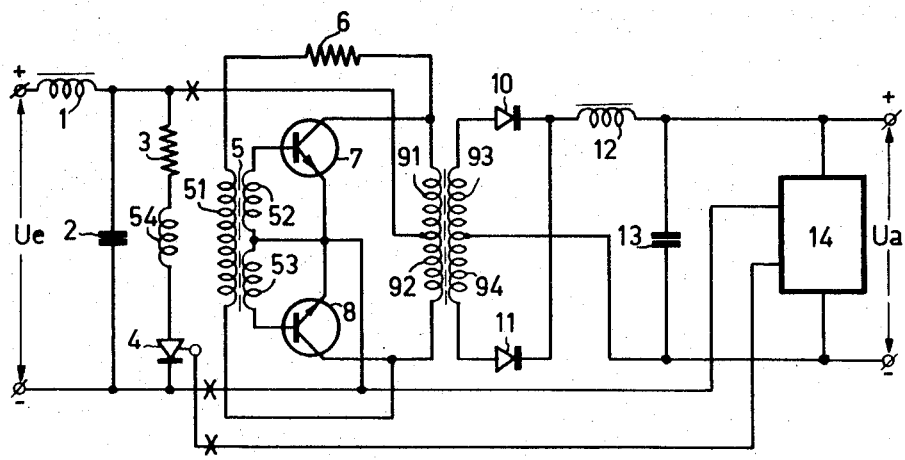

United States Patent [19]
Tollrian et al.

[11] 3,863,125
[45] Jan. 28, 1975

[54] SAFETY CIRCUIT FOR RAPIDLY SWITCHING OFF OSCILLATORS, PARTICULARLY TRANSISTOR DC-DC CONVERTERS, WHEN THE OUTPUT VOLTAGES OR OUTPUT CURRENT EXCEED OR FALL BELOW THE REQUIRED VALUES

[75] Inventors: Herwig Tollrian, Nurnberg; Burghard Krahl, Unterhaidelbach, both of Germany

[73] Assignee: U.S. Philips Corporation, New York, N.Y.

[22] Filed: Mar. 26, 1973

[21] Appl. No.: 345,135

[30] Foreign Application Priority Data
Apr. 14, 1972 Germany.......................... 2217966

[52] U.S. Cl................. 321/11, 317/33 SC, 321/14, 331/62
[51] Int. Cl. ............................................ H02h 7/10
[58] Field of Search ...... 317/16, 31, 33 SC; 321/11, 321/13, 18, 45, 14; 320/DIG. 2; 323/225 C; 331/62

[56] References Cited
UNITED STATES PATENTS

| | | | |
|---|---|---|---|
| 3,243,725 | 3/1966 | Raposa................................. | 321/18 |
| 3,361,952 | 1/1968 | Bishop................................. | 321/45 R |
| 3,371,262 | 2/1968 | Bird et al............................. | 321/14 |
| 3,377,540 | 4/1968 | Meyer................................. | 321/14 |
| 3,408,553 | 10/1968 | Bishop................................. | 321/18 X |
| 3,444,453 | 5/1969 | Peterson............................. | 321/14 |
| 3,460,020 | 8/1969 | Quinn................................. | 321/11 X |
| 3,487,284 | 12/1969 | Cady................................... | 320/DIG. 2 |
| 3,493,838 | 2/1970 | Gyugi................................. | 323/22 SC |
| 3,495,129 | 2/1970 | Donner............................... | 321/11 |
| 3,536,984 | 10/1970 | Rosenberry, Jr.................... | 321/11 |
| 3,667,027 | 5/1972 | Martin................................ | 321/11 |
| 3,670,234 | 6/1972 | Joyce.................................. | 321/11 |
| 3,699,424 | 10/1972 | Hart.................................... | 321/11 |

OTHER PUBLICATIONS
IBM Technical Disclosure Bulletin, "Overvoltage Protective Circuit," Vol. 2, No. 4, p. 96, Dec. 1959.

*Primary Examiner*—William H. Beha, Jr.
*Attorney, Agent, or Firm*—Frank R. Trifari; Simon L. Cohen

[57] ABSTRACT

In a dc-dc converter using a transformer coupled oscillator a threshold switch connected to the dc output of the converter provides a control signal when the voltage and current output parameters exceed predetermined ranges. A thyristor and a resistor connected in series with the main current path of the thyristor are connected across the dc input to the converter and normally provide a high impedance path for an additional coil magnetically coupled to the transformer. The control signal from the threshold switch turns on the thyristor, providing a low impedance path for the coil and thereby interferring with the operation of the oscillator.

6 Claims, 3 Drawing Figures

SAFETY CIRCUIT FOR RAPIDLY SWITCHING OFF OSCILLATORS, PARTICULARLY TRANSISTOR DC-DC CONVERTERS, WHEN THE OUTPUT VOLTAGES OR OUTPUT CURRENT EXCEED OR FULL BELOW THE REQUIRED VALUES

The direct voltage operating telecommunication equipment is provided by current supply units fed by the mains alternating voltage or by a battery direct voltage. Telephone exchanges generally employ a battery voltage of, for example, 60 volts which is converted into an alternating voltage by a converter in a current supply unit, and is transformed to such a value that after rectification and filtering an operating direction voltage of the required value will be available.

For telecommunication apparatus the operating voltage is desired to be constant within generally ± 2 percent of the required value. Since the battery voltage at the telephone exchange may, however, vary between +20 percent and −10 percent dependent on the charge conditon of the cells, the current supply unit incorporates control circuits which eliminate variations in the operating voltage caused by input voltage and load variations.

In order to prevent the telephone equipment from being damaged and the transmission of information from being impeded by overvoltages or undervoltages occurring at the otuput of the current supply unit in the case of a mal-functioning of the control circuit, the operating voltage is supervised. In case of inadmissible voltage variations the malfunctioning equipment is switched off.

In the case of overvoltages this switching off was formerly effected by a supervision device short-circuiting the input or output voltage of the current supply unit; the overvoltage was then initially reduced by an automatic overvoltage protection device before the unit was released, switching off the malfunctioning current supply unit.

This method has the drawback that the short-circuit current must increase to a value which is approximately 10 times higher than the rated current of the automatic over voltage portection device in order to effect a rapid switching off. The corresponding switching means is the current supply unit must therefore be proportional for this high current, and furthermore, sudden voltage variations, which may lead to interferences in transmission, may occur due to the high short-circuit current.

It is an object of the invention to provide a reliable and rapidly responsive safety circuit for a dc-dc converter, avoiding high short-circuit currents and being suitable for protection against overvoltages and currents as well as under voltages and currents.

The circuit arrangement used to satisfy this object according to the invention is further described in the claims.

Dependent on the output power required, the dc-dc converters to which the invention is applicable may be constructed as single-ended, push-pull or bridge type dc-dc converters. In the case of higher output powers the feedback is generally effected by a separate feedback transformer.

Figure 2:
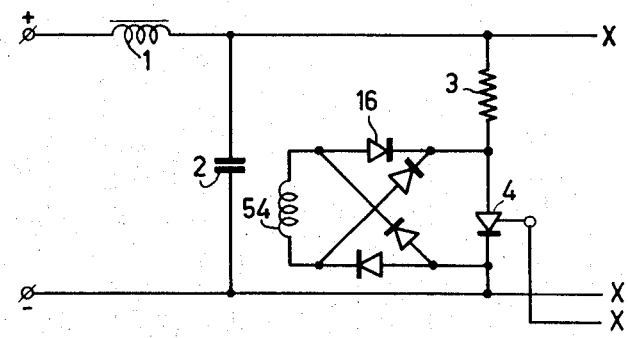
Figure 3:
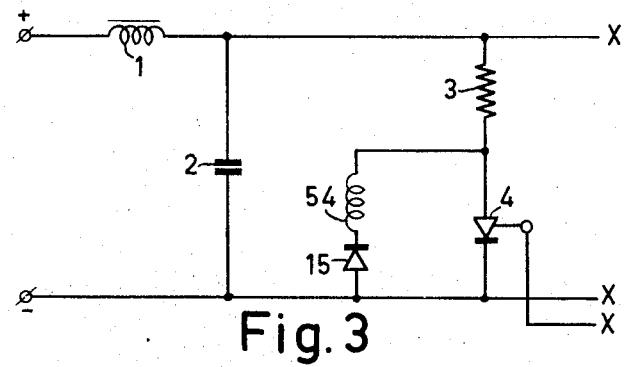

As an embodiment for explaining the invention FIG. 1 shows a push-pull dc-dc converter having a separate embodiment of the invention as applied to feedback transformer. FIGS. 2 and 3 show modifications of this embodiment.

In FIG. 1 the push-pull dc-dc converter comprises a transformer 9 — with coils 91 to 94 —, transistors 7 and 8 and a feedback transformer 5 — with coils 51 and 53 — connected through the resistor 6 to the main transformer 9. This known converter is energized by the input voltage Ue through an input filter comprising a choke 1 and a capacitor 2. The rectangular voltage present at the coils 93 and 94 of the main transformer 9 is rectified through diodes 10 and 11 and is available as a direct voltage Ua at the output of a smoothing filter composed of choke 12 and capacitor 13.

In order to avoid overvoltages the invention provides a cross branch comprising the thyristor 4, an additional coil 54 of the dc-ac converter and a resistor 3 is provided according to the invention in parallel to the input voltage. The thyristor 4 is triggered by a threshold switch 14 supervising the output voltage Ua when the output voltage exceeds an admissible maximum value.

Dependent on its use and operating conditions the threshold switch is constituted either as a voltage threshold value switch for overvoltages or undervoltages in voltage-controlled current supply units, or is constituted as a limit current value switch for current-controlled or constant current supply units such as, for example, remote controlled current supply units. If only the transformed alternating output voltage is derived from the dc-ac converter without subsequent rectification, the threshold switch is constituted accordingly. The switch itself is not within the scope of this invention and is therefore not shown in detail. It is only assumed that it provides a direct voltage signal for triggering the thyristor when the output of the supply exceeds or falls below the adjusted required limit values.

In FIG. 1 the said circuit elements 3, 4, 54 are arranged in series. As soon as thyristor 4 is triggered, a current flows in the cross-branch whose value is essentially adjustable by the resistor 3 up to the maximum value admissible for the thyristor. This current also passes the additional transformer winding 54 and generates a premagnetization in the feedback transformer 5 inhibiting its transmission properties for alternating current nearly or completely. After the thyristor is triggered the oscillations of the push-pull converter then immediately discontinue and the outut voltage drops out. The Figure does not show that this interference is visually indicated, for example, by an incandescent lamp in the cross-branch. The described cross-branch may not only be arranged after the input filter, as is shown, but alternatively before the input filter. In dc-dc converters without a separate feedback transformer the additional winding 54 is to be provided on the dc-dc converter transformer itself.

FIGS. 2 and 3 show modifications of the circuit arrangement according to the invention, to be provided in the arrangement of FIG. 1 at the left of the connection points denoted by X.

According to FIG. 2 the additional winding 54 is connected in parallel with thyristor 4 through a bridge rectifier arrangement 16. The rectifier arrangement 16 cuts off the direct voltage present so that a forward current does not flow. Before the thyristor is triggered the winding 54 is bridged in a high-resistive manner by the thyristor and is inactive for that reason. However, the thyristor 4 being triggered constitutes an active short circuit for the winding 54 via the rectifier arrangement 16 so that the transmission properties of the feedback transformer are again reduced resulting in the oscillations of the dc-ac converter dropping out.

Practice has proved tht it is not necessary to short-circuit the two half waves of the feedback oscillation. The oscillations of the dc-ac converter already drop out when only half wave is strongly attenuated due to short circuit. This aspect leads to the simplified circuit arrangement according to FIG. 3 in which only one diode 15 is provided for cutting off the direct voltage.

What is claimed is:

1. In a dc-dc converter of the type wherein an oscillator receives an input dc voltage and wherein a converter coupled to the oscillator provides a rectified dc output signal having a predetermined current and voltage parameter range, the improvement comprising a threshold value circuit means connected to the converter output for providing a control signal in response to an output parameter in excess of the predetermined values, a resistor, an additional winding on a transformer of the oscillator, a thyristor having a main current path in series circuit with said resistor and said additional winding and having a control input connected to the output of said threshold value circuit means and providing a low impedance path through the main current path in response to said control signal, electrical means connecting the series circuit across the input dc voltage, whereby said thyristor provides a low impedance path for current through said additional coil and said resistor in response to said control signal, thereby inhibiting the operation of said oscillator.

2. A safety circuit as claimed in claim 1, characterized in that the additional winding is a winding of a separate feedback transformer (5).

3. A safety circuit as claimed in claim 1, characterized in that the thyristor (4), the series resistor and the additional winding are arranged in series.

4. A safety circuit as claimed in claim 1, characterized in that thyristor (4) and series resistor (3) are arranged in series and that the additional winding (54) is connected in parallel with the thyristor through a rectifier (15, 16).

5. A safety circuit as claimed in claim 4, characterized in that a diode (15) serves as a rectifier.

6. A safety circuit as claimed in claim 4, characterized in that a bridge rectifier (16) is used.

* * * * *

PO-1050
(5/69)

UNITED STATES PATENT OFFICE
CERTIFICATE OF CORRECTION

Patent No. 3,863,125                    Dated January 28, 1975

Inventor(s) HERWIG TOLLRIAN and BURGHARD KRAHL

It is certified that error appears in the above-identified patent and that said Letters Patent are hereby corrected as shown below:

ON THE TITLE PAGE

"[30]    Foreign Application Priority Data

Apr. 14, 1972   Germany..............2217966"

should read:

--[30]   Foreign Application Priority Data

Apr. 14, 1972   Germany..............P.2217966.4--;

IN THE SPECIFICATION

Col. 1, line 45, "over voltage portection" should be

--overvoltage protection--;

line 46, "is" should be --in--;

line 47, "proportional" should be --proportioned--;

Col. 3, line 4, "tht" should be --that--;

Signed and sealed this 15th day of April 1975.

(SEAL)
Attest:

RUTH C. MASON
Attesting Officer

C. MARSHALL DANN
Commissioner of Patents
and Trademarks